US010715377B2

(12) United States Patent
Brzozowski et al.

(10) Patent No.: US 10,715,377 B2
(45) Date of Patent: Jul. 14, 2020

(54) DOMAIN NAME SERVICES SERVERS MANAGEMENT TO SHARE DATA EFFICIENTLY

(71) Applicant: Comcast Cable Communications, LLC, Philadelphia, PA (US)

(72) Inventors: John Jason Brzozowski, Schwenksville, PA (US); Chris Griffiths, Media, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 960 days.

(21) Appl. No.: 13/724,405

(22) Filed: Dec. 21, 2012

(65) Prior Publication Data

US 2014/0181321 A1    Jun. 26, 2014

(51) Int. Cl.
*G06F 13/00*     (2006.01)
*H04L 29/06*     (2006.01)
*H04L 29/12*     (2006.01)
*H04L 29/08*     (2006.01)

(52) U.S. Cl.
CPC .... *H04L 29/06047* (2013.01); *H04L 61/1511* (2013.01); *H04L 61/6009* (2013.01); *H04L 67/1036* (2013.01); *H04L 61/1552* (2013.01)

(58) Field of Classification Search
CPC ............... H04L 29/06; H04L 29/08072; H04L 29/08549; H04L 29/08801; H04L 29/12009; H04L 29/12066; H04L 61/1511; G06F 3/067
USPC .................................................. 709/245, 216
See application file for complete search history.

(56) References Cited

U.S. PATENT DOCUMENTS

| | | | |
|---|---|---|---|
| 7,653,700 B1* | 1/2010 | Bahl | H04L 12/2602 709/216 |
| 2004/0073707 A1 | 4/2004 | Dillon | |
| 2006/0277278 A1 | 12/2006 | Hegde et al. | |
| 2008/0288470 A1* | 11/2008 | Goutard et al. | 707/4 |
| 2010/0199122 A1 | 8/2010 | Sood | |
| 2012/0155646 A1* | 6/2012 | Seshadri | H04L 9/083 380/279 |
| 2012/0284505 A1* | 11/2012 | Smith et al. | 713/151 |

FOREIGN PATENT DOCUMENTS

| | | |
|---|---|---|
| EP | 1838071 A1 | 9/2007 |
| WO | 2013119516 A1 | 8/2013 |

OTHER PUBLICATIONS

Vixie et al, Secret Key Transaction Authentication for DNS (TSIG), Network Working Group, Request for Comments: 2845 (RFC-2845), pp. 1-15, published May 2000.*
P. Vixie; "A mechanism for prompt notification of Zone changes (DNS Notify)", RFC: 1996, Aug. 1, 1996.

(Continued)

*Primary Examiner* — Robert B Harrell
(74) *Attorney, Agent, or Firm* — Banner & Witcoff, Ltd.

(57) ABSTRACT

A method and system for implementing domain name services (DNS) is described. In one aspect a query from a user device for access to a particular resource record may be received and forwarded to an authoritative DNS device. A reply to the query may be received from the authoritative DNS device. Information of the reply also may be distributed to other DNS devices.

20 Claims, 5 Drawing Sheets

(56) References Cited

OTHER PUBLICATIONS

D. Estlake 3rd.; CyberCash, Inc.; "Secure domain name system dynamic update"; RFC: 2137; Apr. 1, 1997.
Extended European Search Report—EP 13198724.0—dated Apr. 8, 2014.
J. Abley, "Operation of Anycast Services," Dec. 2006, 24 pages.
J. Abley, "A Software Approach to Distributing Requests for DNS Service using GNU Zebra, ISC BIND 9 and FreeBSD," Proceedings of the FREENIX Track: 2004 USENIX Annual Technical Conference, Jun. 27-Jul. 2, 2004, 5 pages).
Response to European Office Action—EP Appl. 13198724.0—submitted Dec. 21, 2015.
European Office Action—EP 13198724.0—dated Jun. 22, 2015.
May 24, 2017—(EP) Result of Consultation—App No. 13198724.0.
Oct. 18, 2019—Canadian Office Action—CA 2,837,405.

* cited by examiner

FIG. 5

DOMAIN NAME SERVICES SERVERS MANAGEMENT TO SHARE DATA EFFICIENTLY

BACKGROUND

Recursive and caching Domain Name Services (DNS) offer scalable access to content and services on the Internet today. The environment for providing content and services is ever changing. As a result, underlying infrastructure is also changing. Participants in the Internet eco-systems perpetually are seeking to modify and create new techniques to deliver content and services to the public.

Traditional recursive and caching DNS infrastructure may require updates or enhancements to support current practices. One approach specific to recursive and caching DNS services is to deploy clusters of some quantity of DNS servers behind a network device that provides load balancing. Typical load balanced DNS server implementations, however, do not intercommunicate or share learned data or cached queries and suffer from other shortcomings. These result, for example, in a need for each DNS server to learn via recursion, the data required to respond to original end-user queries. These and other shortcomings are addressed by this disclosure.

BRIEF SUMMARY

The following presents a simplified summary of the present disclosure in order to provide a basic understanding of some features of the disclosure. This summary is provided to introduce a selection of concepts in a simplified form that are further described below. This summary is not intended to identify key features or essential features of the disclosure.

Some aspects of the present disclosure describe a protocol and process for use by caching domain name services (DNS) servers to share data more efficiently, and provide improved response time for DNS server queries. The benefits include increased DNS server efficiency.

In accordance with one or more aspects of the present disclosure a method and system for sharing DNS server cache is described. A query from a user device for access to particular data, e.g., a resource record, may be received and forwarded to an authoritative DNS server. A reply to the query may be received from the authoritative DNS server. The reply may be cached in a first caching DNS server. The reply also may be distributed by a specific type of protocol from the first caching DNS server to at least one other caching DNS server. The caching may be based on a time to live value associated with the particular resource record. The particular resource record may be a website, for example, and the query may include a request to resolve the website into an internet protocol address. The reply may be the internet protocol address.

In another aspect of the disclosure, implementation includes receiving a reply to a first query from a first user device for access to a particular resource record of an authoritative DNS server. The reply may be cached. A second query from a second user device for access to the particular resource record may be received and the reply may be forwarded to the second user device. The reply to the first query may be distributed by a specific protocol to another caching DNS server.

BRIEF DESCRIPTION OF THE DRAWINGS

Some embodiments of the present disclosure are illustrated by way of example, and not by way of limitation, in the figures of the accompanying drawings and in which like reference numerals refer to similar elements.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Aspects of the disclosure may be operational with numerous general purpose or special purpose computing system environments or configurations. Examples of computing systems, environments, and/or configurations that may be suitable for use with features described herein include, but are not limited to, personal computers, server computers, hand-held or laptop devices, smartphones, multiprocessor systems, microprocessor-based systems, set top boxes, digital video recorders, programmable consumer electronics, spatial light modulators, network (e.g., Internet) connectable display devices, network PCs, minicomputers, mainframe computers, rendering devices including television sets, distributed computing environments that include any of the above systems or devices, and the like.

The features may be described and implemented in the general context of computer-executable instructions, such as program modules, being executed by one or more computers. Generally, program modules include routines, programs, objects, components, data structures, etc. that perform particular tasks or implement particular abstract data types. Features herein may also be practiced in distributed computing environments where tasks are performed by remote processing devices that are linked through a communications network. In a distributed computing environment, program modules may be located in both local and remote computer storage media including memory storage devices. Concepts of the present disclosure may be implemented for any format or network environment capable of carrying video content.

Figure 1:
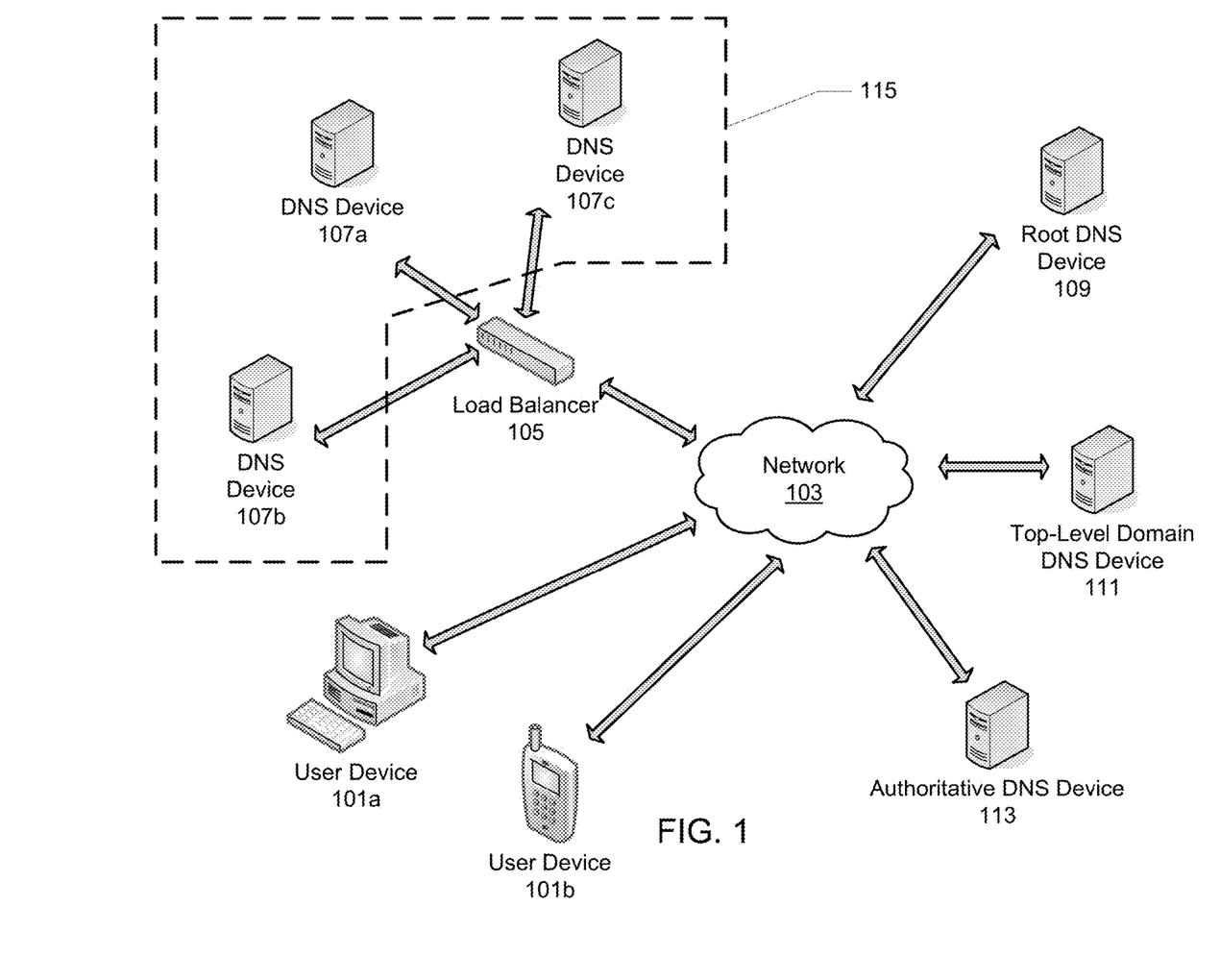
FIG. 1 illustrates an example network for delivering or accessing content in accordance with one or more aspects of the disclosure herein.

FIG. 1 illustrates an example network for accessing content in accordance with one or more aspects of the disclosure herein. A domain name services (DNS) collection 115 is shown. DNS collection 115 may be one or more caching DNS devices, such as a computing device, e.g., server, such as DNS devices 107a, 107b, and 107c, which are participating in providing services to user devices, such as user device 101a and/or 101b. DNS devices 107a, 107b, and/or 107c may reside in one or more collections 115 of devices. DNS devices 107a, 107b, and/or 107c in a collection 115 may share learned, cached DNS query responses using a specific protocol, such as an internet protocol (IP) version independent multicast DNS server caching protocol. In such a case, a particular version of the IP protocol, such as IPv4 or IPv6, is not necessary for Internet protocol communication between the DNS devices.

DNS devices 107a, 107b, and 107c may be DNS servers associated with a user device 101a and/or 101b. In some examples, user device 101a and/or 101b is configured to have a DNS device 107a, 107b, and/or 107c for accessing and/or requesting content from an authoritative DNS device, such as authoritative DNS device 113. In the example of FIG. 1, a load balancer 105, a device that allows for distribution of load, is shown to load balance user device 101a and/or 101b queries to access a particular resource record, such as a particular uniform resource locator. A query may be a request to access a particular URL, such as www.example.com. A load balancer, such as load balancer 105, may be configured to receive queries from user devices, such as user device 101a and/or 101b, and load balance the queries to a plurality of DNS devices associated with the load balancer and the user device. Load balancer 105 may be a physical device separate and apart from any one DNS device 107a, 107b, and/or 107c or may be operationally integrated into a DNS device.

In an embodiment, user device 101a and/or 101b may be a computing device associated with a user. The user device may reside in a home, a business, a multi-dwelling unit, or an institution that may be connected to an external network, such as the network 103 via an interface. The user device may be a desktop and/or laptop type computer, and/or some other type of computing device, such as a smartphone. An external network transmission connection (coaxial line, fiber line, wireless, etc.) may be connected to the user device 101a and/or 101b. In one example, the user device 101a and/or 101b may be a gateway, configured to communicate over the network 103 with load balancer 105.

User device 101a and/or 101b may be connected to a variety of devices within a user premises, and may coordinate communications among those devices, and between the devices and networks outside the user premises. For example, user device 101a and/or 101b may include a modem (e.g., a DOCSIS device communicating with a CMTS in one type of network), and may offer Internet connectivity to one or more computers within the user premises and one or more mobile devices (e.g., mobile phones, personal digital assistants, tablet computing devices and the like) within and/or outside of user premises. Although not shown, mobile devices may communicate with user device 101a and/or 101b through another device and/or network, such as network 103. The connectivity may also be extended to one or more wireless routers. For example, a wireless router may be an IEEE 802.11 router, local cordless telephone (e.g., Digital Enhanced Cordless Telephone—DECT), or any other desired type of wireless network. Various wireless devices within a home, such as a DECT phone (or a DECT interface within a cordless telephone), a portable media player, portable laptop computer, mobile devices, and a pico-projector, may communicate with the user device 101a and/or 101b using a wireless router.

The user device 101a and/or 101b may also include one or more voice device interfaces to communicate with one or more voice devices, such as telephones. The telephones may be traditional analog twisted pair telephones (in which case the user device 101a and/or 101b may include a twisted pair interface), or they may be digital telephones such as a Voice Over Internet Protocol (VoIP) telephones, in which case the phones may simply communicate with the user device 101a and/or 101b using a digital interface, such as an Ethernet interface.

The user device 101a and/or 101b may communicate with the various devices within a user premises using any desired connection and protocol. For example, a MoCA (Multimedia Over Coax Alliance) network may use an internal coaxial cable network to distribute signals to the various devices in the user premises. Alternatively, some or all of the connections may be of a variety of formats (e.g., MoCA, Ethernet, HDMI, DVI, twisted pair, etc.), depending on the particular end device being used. The connections may also be implemented wirelessly, using local wi-fi, WiMax, Bluetooth, or any other desired wireless format.

The user device 101a and/or 101b, which may comprise any processing, receiving, and/or displaying device, such as one or more televisions, smart phones, set-top boxes (STBs), digital video recorders (DVRs), gateways, etc., can serve as a network interface between devices in the user premises and a network, such as network 103. Network 103 may be any type of communication network, such as satellite, fiber optic, coaxial cable, cellular telephone, wireless (e.g., WiMAX), twisted pair telephone, etc., or any combination thereof (e.g., a hybrid fiber coaxial (HFC) network).

In an aspect of the disclosure, user device 101a and/or 101b sends queries to access particular resource records, such as a website to an associated DNS device. In the example of FIG. 1, queries are sent through a load balancer 105 and then to a particular DNS device, such as DNS device 107a of the collection of DNS devices 115. For example, a user at user device 101a and/or 101b may have entered a URL of www.example.com. The query to resolve the example.com domain into an internet protocol (IP) address may be passed to the user device's 101a and/or 101b DNS device 107a through load balancer 105. If DNS device 107a has already cached the requested particular resource record, the IP address is returned to the user device 101a and/or 101b.

If DNS device 107a has no information related to the requested particular resource record, e.g., example.com, the DNS device 107a may act as a DNS client and launch a series of iterative queries against other DNS devices. In some examples, the DNS device 107a does not know the IP address of the www.example.com website, and the IP address of a DNS device 113 that is authoritative for the example.com domain. However, DNS device 107a may know the IP address to a root level DNS device 109. In this instance, DNS device 107a may forward the query to the root DNS device 109.

Similar to the DNS device 107a, root DNS device 109 may not know the IP address of the authoritative device 113 for the www.example.com website. However, the root DNS device 109 may know the IP address of a top-level domain (TLD) DNS device 111 that is responsible for the .com domain. In response, root DNS device 109 may reply to the DNS device 107a with the IP address of the TLD DNS device 111. With this information, referred DNS device 107a then may send the query to the TLD DNS device 111, in this case the .com DNS device because the desired particular resource record is the IP address for www.example.com. TLD DNS device 111 does not know the IP address of the www.example.com website. However TLD DNS device 111 knows the IP address of the authoritative DNS device 113 that is authoritative for the example.com domain. TLD DNS device 111 replies to the DNS device 107a with the IP address of the authoritative DNS device 113 that is authoritative for the example.com domain. DNS device 107a sends the query to the authoritative DNS device 113 for the example.com website, which in turn returns the IP address for the requested website. This IP address ultimately is returned to the user device 101a and/or 101b that requested it in the initial query.

Figure 3:
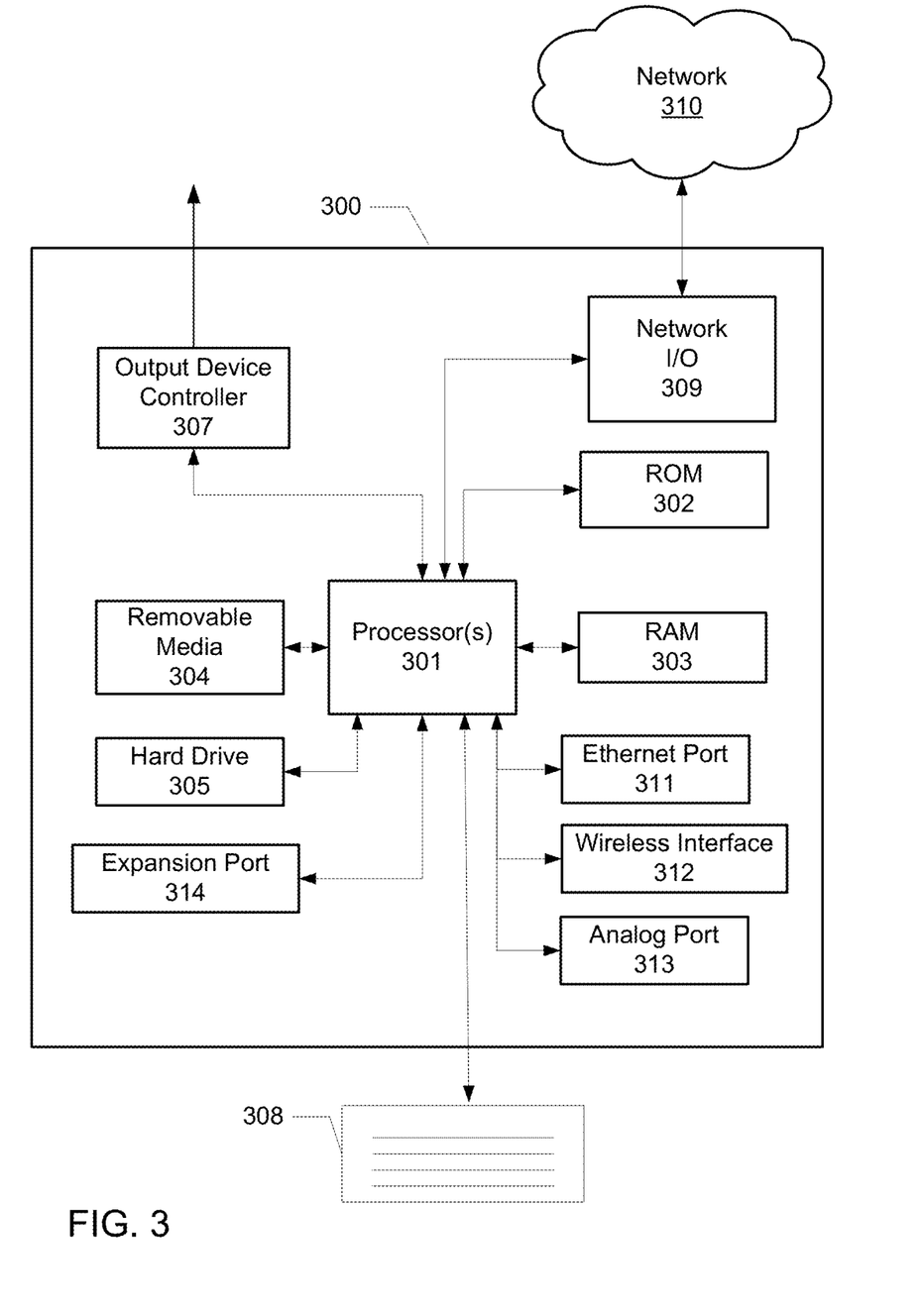
FIG. 3 illustrates an example computing device on which various features described herein may be implemented.

FIG. 3 illustrates a computing device that may be used to implement a DNS device 107a, 107b, 107c, 109, 111, and/or 113 although similar components (e.g., processor, memory, non-transitory computer-readable media, etc.) may be used to implement any of the devices described herein. DNS device 107a, 107b, 107c, 109, 111, and/or 113 may include one or more processors 301, which may execute instructions of a computer program to perform any of the features described herein. Those instructions may be stored in any type of non-transitory computer-readable medium or memory, to configure the operation of the processor 301. For example, instructions may be stored in a read-only memory (ROM) 302, random access memory (RAM) 303, removable media 304, such as a Universal Serial Bus (USB) drive, compact disc (CD) or digital versatile disc (DVD), floppy disk drive, or any other desired electronic storage medium. Instructions may also be stored in an attached (or internal) hard drive 305.

DNS device 107a, 107b, 107c, 109, 111, and/or 113 may include or be connected to one or more output devices, such as a display (or, e.g., an external television that may be connected to a set-top box), and may include one or more output device controllers 307, such as a video processor. There may also be one or more user input devices 308, such as a wired or wireless remote control, keyboard, mouse, touch screen, microphone, etc. The DNS device 107a, 107b, 107c, 109, 111, and/or 113 also may include one or more network input/output circuits 309, such as a network card to communicate with an external network, such as network 310 in FIG. 3 and/or network 103 in FIG. 1. The physical interface between the DNS device 107a, 107b, 107c, 109, 111, and/or 113 and a network, such as network 103 may be a wired interface, wireless interface, or a combination of the two. In some embodiments, the physical interface of the DNS device 107a, 107b, 107c, 109, 111, and/or 113 may include a modem (e.g., a cable modem), and the external network may include a television content distribution system, such as a wireless or an HFC distribution system (e.g., a DOCSIS network).

The DNS device 107a, 107b, 107c, 109, 111, and/or 113 may include a variety of communication ports or interfaces to communicate with the various home devices. The ports may include, for example, an Ethernet port 311, a wireless interface 312, an analog port 313, and any other port used to communicate with devices in the user premises. The DNS device 107a, 107b, 107c, 109, 111, and/or 113 may also include one or more expansion ports 314. The expansion port 314 may allow the user to insert an expansion module to expand the capabilities of the DNS device 107a, 107b, 107c, 109, 111, and/or 113. As an example, the expansion port 314 may be a Universal Serial Bus (USB) port, and can accept various USB expansion devices. The expansion devices may include memory, general purpose and dedicated processors, radios, software and/or I/O modules that add processing capabilities to the DNS device 107a, 107b, 107c, 109, 111, and/or 113. The expansions can add any desired type of functionality, several of which are discussed further below.

Returning to FIG. 1, in a collection 115 of DNS devices 107a, 107b, and 107c, at least one DNS device, such as DNS device 107a may be a transmitter. The transmitter DNS device 107a may be a device that has issued recursive DNS queries based on end user queries. In an embodiment, the result of these queries, depending on the deployment, may be cached for a configured period of time, defined by a time to live (TTL) values, such as 60 seconds. The transmitter DNS device 107a may distribute, using an internet protocol version independent multicast DNS device caching protocol, replies to queries to the other DNS devices, such as DNS devices 107b and 107c, in the collection 115. The transmitter DNS device 107a distributes/shares DNS query responses at a specific interval, which may be configurable. Any collection 115 may have one or more DNS devices, such as DNS device 107a, acting as a transmitter. The data may be sent over IPv4 and/or IPv6 depending on the desired communication between the DNS devices in the collection. One transport for the transmission of the learned data for DNS devices in a collection that are local to one another is IP multicast addresses.

The other DNS devices, such as DNS devices 107b and 107c, in a collection 115 may be configured as receivers. Receiver DNS devices 107b and 107c are the elements that are listening on IP multicast groups for data being sent by a transmitter, DNS device 107a, providing the receivers are in the same collection 115 as the transmitter. Upon receipts of authorized and authenticated data, receivers 107b and 107c immediately populate or update the DNS device's local cache of DNS data. A receiver DNS device 107b and/or 107c may not be actively a transmitter; however, a receiver automatically may be promoted to be a transmitter if another transmitter is not detected in a specified period of time. The data being updated may be specified as part of the DNS cache object. The update, creation, or deletion depends on the attributes sent as part of the DNS cache object by the transmitter DNS device 107a, which may be updated based on data learned recursively.

A DNS cache object may be an abstract construct to represent the data attributes that are typically associated with a DNS query and query reply. Some attributes that may be considered include the DNS query, the DNS query type, and the DNS TTL. Example DNS query replies may include an address record, type A, that is a 32-bit IPv4 address to map hostnames to an IP address of the host, an IPv6 address record, type AAAA, that is a 128-bit IPv6 address to map hostnames to an IP address of the host, canonical name record, type CNAME, the alias of one name to another, a pointer record, type PTR, that is a pointer to a canonical name, and a service locator, type SRV, that is a generalized service location record. The eligible DNS cache object attributes may be configurable and not all DNS query and query reply attributes may be accepted by default.

In one example, a receiver DNS device may be primed with the transaction signature (TSIG) key information for any associated transmitter DNS device on the same multicast node. Utilizing the TSIG key information between the transmitter DNS device and the receiver DNS device may ensure that no third party can engage in unauthorized updates across the multicast nodes and ensures the integrity of the DNS data that is being passed. In an embodiment, a transmitter DNS device has both the ability to create and share TSIG key information with potential receivers on their multicast node. To keep the transmitter and receiver functions secure on all participating caching DNS devices, each node may utilize TSIG as a method to secure the communications.

Figure 2:
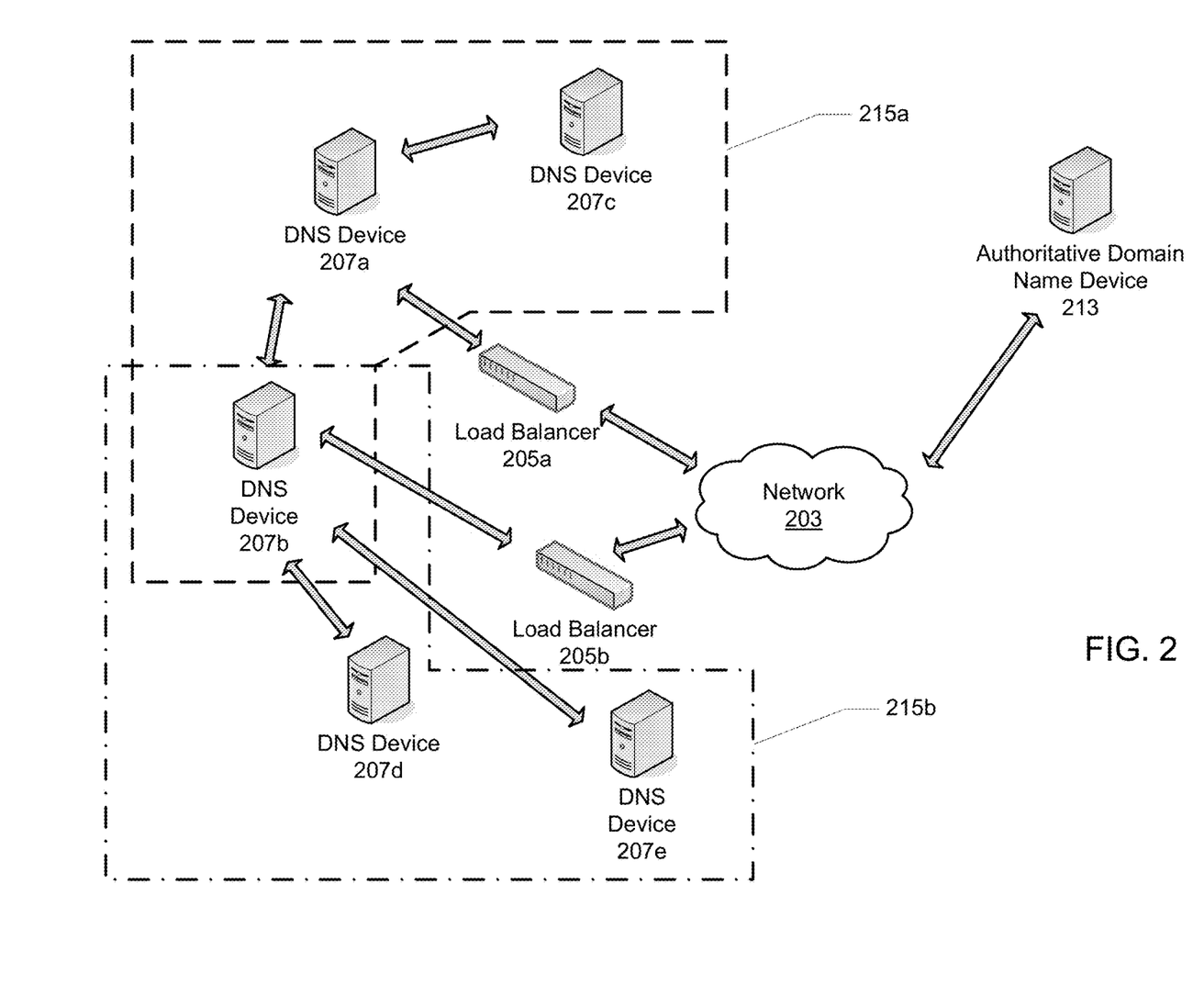
FIG. 2 illustrates another example network for delivering or accessing content in accordance with one or more aspects of the disclosure herein.

FIG. 2 illustrates another example network for accessing content in accordance with one or more aspects of the disclosure herein. In the example of FIG. 2, two different collections 215a and 215b of DNS devices are shown. Collection 215a includes three DNS devices 207a, 207b, and 207c. Collection 215b includes three DNS devices 207b, 207d, and 207e. As such, DNS device 207b is included in both collections 215a and 215b. A load balancer 205a may be utilized to load balance queries across the collection 215a of DNS device 207a, 207b, and 207c. Similarly, a load balancer 205b may be utilized to load balance queries across the collection 215b of DNS device 207b, 207d, and 207e. Communications between an authoritative DNS device 213 and one or more DNS devices in a collection may occur through a network 203. Network 203 may include one or more components as described above with respect to network 103.

In the example of FIG. 2, DNS device 107b may perform a transmitter DNS device function and a receiver DNS device function. When in operation with respect to collection 215a, DNS device 207b may operate as a receiver DNS device by receiving replies to queries from DNS device 207a. Then, when in operation with respect to collection 215b, DNS device 207b may operate as a transmitter DNS device by distributing replies to DNS devices 207d and 207e. The distribution may be by an internet protocol version independent multicast DNS device caching protocol.

In utilizing one or more aspects of the present disclosure, off network, recursive name device queries are reduced by seeding data in caching or recursive DNS devices proactively. Seeding DNS device caches in this manner may reduce costs associated with network peering. In addition, by seeding DNS device cache data off network, traffic related to DNS operation significantly may be reduced. Further, alleviating the need for additional round trip communications improves DNS device efficiency and response times for end users. Given the volume of data associated with the growing domain name system security extension (DNSSEC) deployments, seeding DNS device caches improves performance, saves on network costs, and increases the network efficiency related to DNS.

As described herein, an IP version independent multicast DNS caching protocol may be utilized to distribute replies to queries. For distribution, a collection of DNS devices that supports caching and recursion is needed, and the collection includes more than one physical DNS device. Each DNS device in the collection supports an IP version independent multicast DNS caching protocol. For a particular query, one DNS device in the collection acts as the transmitter. However, depending upon the particular operation, one or more of the DNS devices in the collection may act as a transmitter and a receiver. For a particular query, after the transmitter DNS device, all remaining DNS devices in the collection act as receivers.

For network, (e.g., Internet) services, the load balancer may be implemented as a software and/or hardware program that is listening or otherwise monitoring the port where external user devices connect to access services. The load balancer forwards requests to one of the backend devices, which usually replies to the load balancer. This allows the load balancer to reply to the user device without the end user ever knowing about the internal separation of functions. It also prevents user devices from contacting backend devices directly, which may have security benefits by hiding the structure of the internal network and preventing attacks on the kernel's network stack or unrelated services running on other ports.

Figure 4:
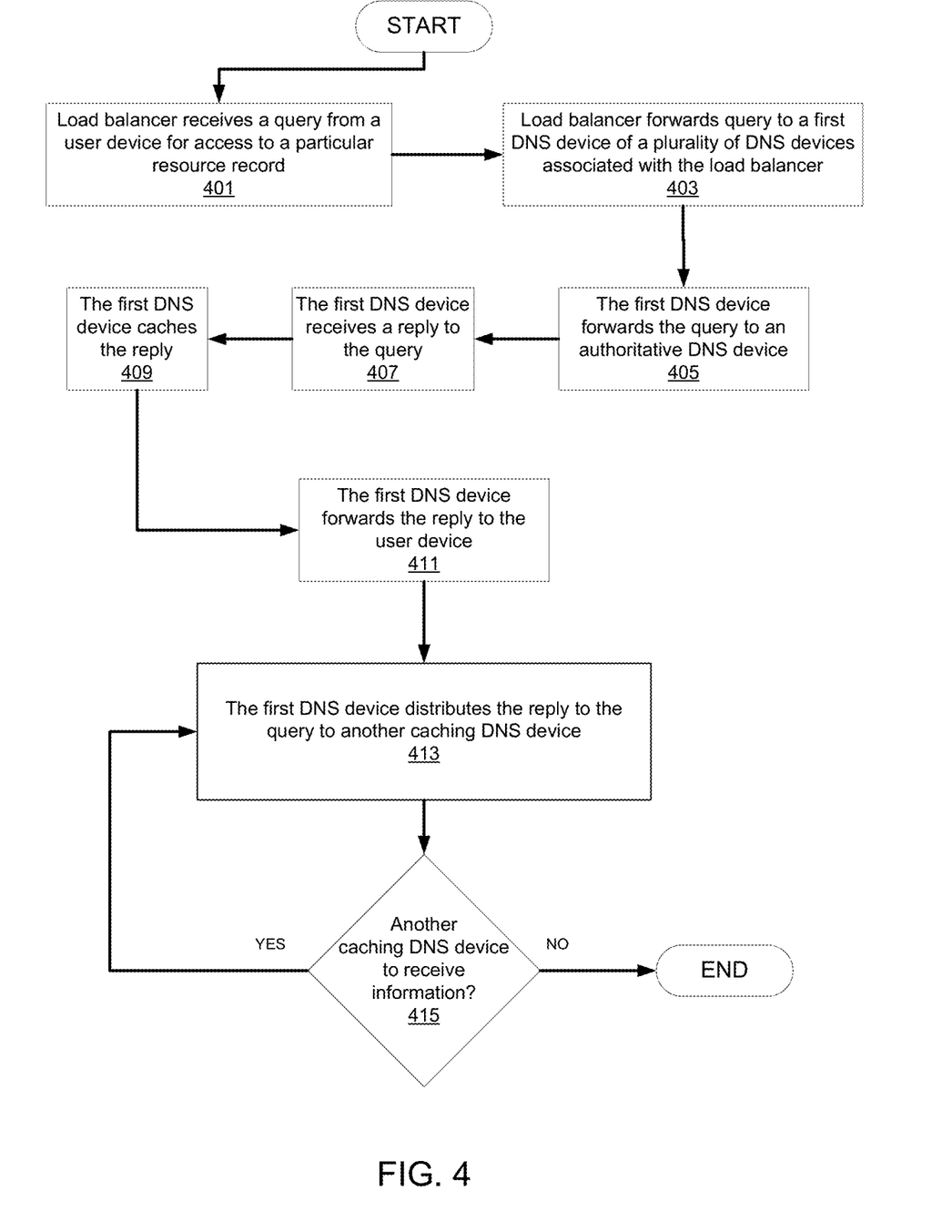
FIG. 4 is an illustrative flowchart of a method in accordance with one or more aspects of the disclosure herein.

FIG. 4 is an illustrative flowchart of a method in accordance with one or more aspects of the disclosure herein. FIG. 4 illustrates an example where devices, such as load balancer 105 and DNS device 107a in FIG. 1, may be configured to operate a process for managing shared cache content. In step 401, a load balancer receives a query from a user device for access to a particular resource record. The particular resource record may be an IP address for a website, such as www.example.com. The user device may be user device 101a and/or 101b in FIG. 1. In step 403, the load balancer forwards the query to a first DNS device of a plurality of DNS devices associated with the load balancer. For example, the load balancer may be load balancer 105 and the first DNS device may be DNS device 107a. The plurality of DNS devices may be DNS devices 107a, 107b, and 107c as illustrated in FIG. 1. The plurality of DNS devices may be part of a collection, such as collection 115.

Proceeding to step 405, the first DNS device, such as DNS device 107a, forwards the query to an authoritative DNS device, such as authoritative DNS device 113 in FIG. 1. In step 407, the first DNS device receives a reply to the query from the authoritative DNS device. The reply may be an IP address or locator for the desired particular resource record. Then, in step 409, the first DNS device optionally may cache the reply, e.g., the IP address of the particular resource record, in its local cache of DNS data. In step 411, the first DNS device forwards the reply to the user device that initially queried the load balancer in 401.

In step 413, the first DNS device may transmit or otherwise share information as described herein. Having received the reply, from the authoritative DNS device, to the query from the user device, the first DNS device distributes the reply to the query. The distribution may occur by way of an IP independent version multicast DNS device caching protocol. The distribution of the information included in the reply is to another one of the caching DNS devices in the plurality of DNS devices. Then, in step 415, a determination may be made as to whether another caching DNS device in the plurality of DNS devices needs to receive the information included in the reply. If not, the process ends. If there is another DNS device to be distributed the information included in the reply, the process returns to step 413 for distribution of that information to another DNS device. As such, the reply to the DNS queries for a particular resource record may be processed by any of the DNS devices in the collection without the need for off network, recursive DNS queries.

Figure 5:
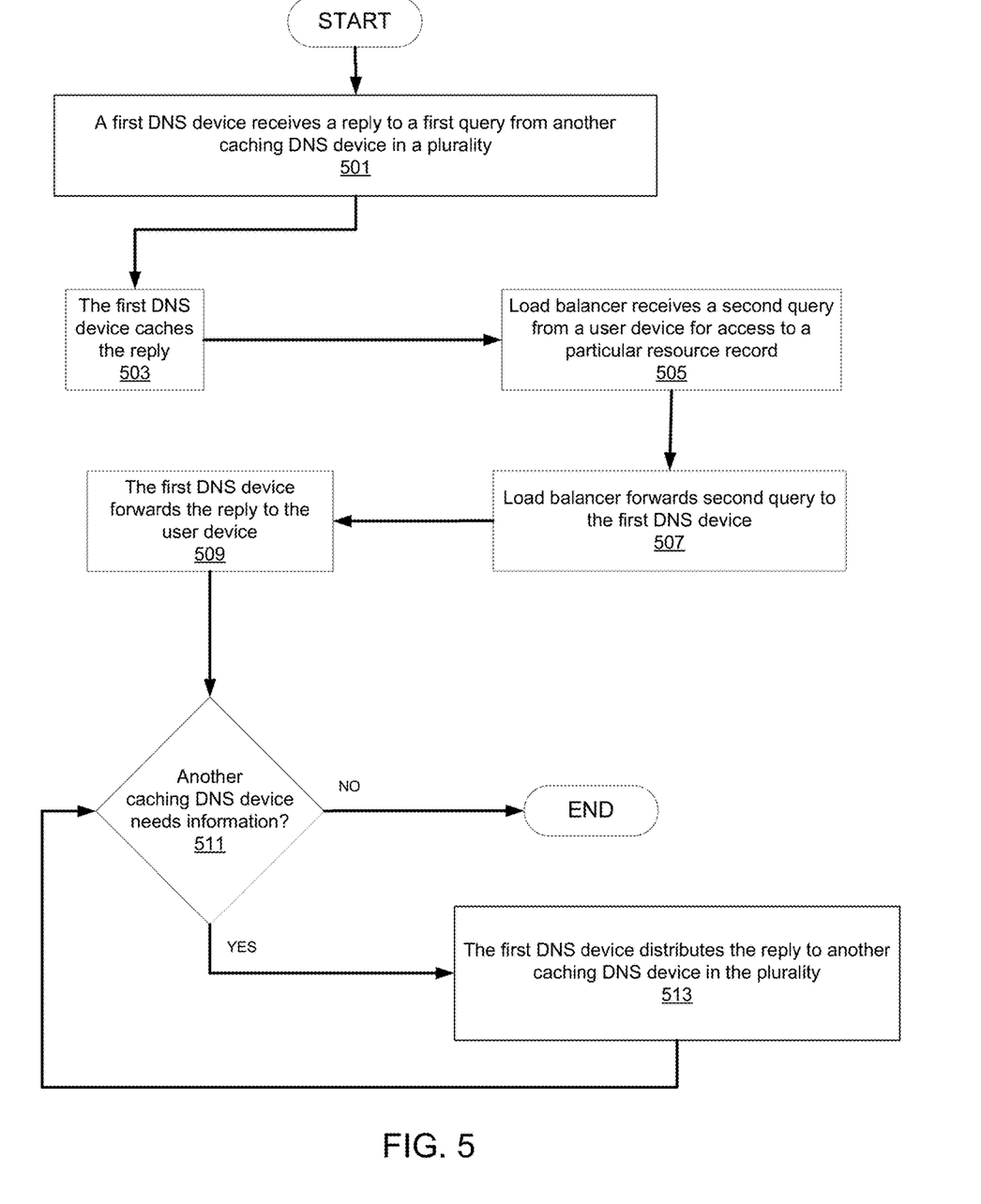
FIG. 5 is an illustrative flowchart of a method in accordance with one or more aspects of the present disclosure.

FIG. 5 is an illustrative flowchart of a method in accordance with one or more aspects of the present disclosure. FIG. 5 illustrates an example where devices, such as load balancer 105 and DNS device 107b in FIG. 1, may be configured to operate a process for receiving shared cache content. In step 501, a first DNS device the first DNS device operates as a receiver as described herein. The first DNS device receives a reply to a first query that originated form a user device. The distribution may occur by way of an IP independent version multicast DNS device caching protocol. The reply may be an IP address for a particular resource record that was requested by a user device, such as user device 101a and/or 101b in FIG. 1. In step 503, the first DNS device may optionally cache the reply, e.g., the IP address of the particular resource record, in its local cache of DNS data.

In step 505, a load balancer receives a second query from a user device for access to the particular resource record that also happened to be the query associated with the reply received in step 501. The particular resource record may be an IP address for a website, such as www.example.com. The user device may be user device 101a and/or 101b in FIG. 1. In step 507, the load balancer forwards the second query to the first DNS device of a plurality of DNS devices associated with the load balancer. For example, the load balancer may be load balancer 105 and the first DNS device may be DNS device 107b. The plurality of DNS devices may be DNS devices 107a, 107b, and 107c as illustrated in FIG. 1. The plurality of DNS devices may be part of a collection, such as collection 115. Proceeding to step 509, the first DNS device forwards the reply to the user device that initially queried the load balancer in 505.

Moving to step 511, a determination is made as to whether another caching DNS device in the plurality of DNS devices needs to receive the information in the reply. If not, the process ends. If there is another DNS device needing to receive the information in the reply, the process proceeds to step 513 for distribution to another DSN device. In step 513, the first DNS device operates as a transmitter as described herein. Having cached the reply to the query for the particular resource record, the first DNS device distributes the information of the reply to the query. The distribution occurs by way of an IP independent version multicast DNS device caching protocol. The distribution of the information of the reply is to another one of the caching DNS devices in the plurality of DNS devices. The process then returns to step 511.

Other embodiments include numerous variations on the devices and techniques described above. Embodiments of the disclosure include a non-transitory machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause one or more devices to carry out operations such as are described herein.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present disclosure in various embodiments and with various modifications as are suited to the particular use contemplated. The features of the embodiments described herein may be combined in all possible combinations of methods, apparatuses, modules, systems, and non-transitory machine-readable storage media. Any and all permutations of features from above-described embodiments are the within the scope of the disclosure.

The invention claimed is:

1. A method comprising:
 receiving, by a first domain name services (DNS) device of a plurality of DNS devices, a reply to a query for access to a resource record;
 caching, by the first DNS device, the reply; and
 transmitting, to a second DNS device of the plurality of DNS devices, and prior to receiving, from the second DNS device, a request associated with the resource record, information of the reply, wherein the first DNS device is associated with a first load balancer device and the second DNS device is associated with a second load balancer device.

2. The method of claim 1, further comprising receiving, by the first DNS device, the query.

3. The method of claim 2, further comprising forwarding, by the first DNS device, the query to an authoritative DNS serszver.

4. The method of claim 2, wherein the receiving the query comprises receiving, from the first load balancer device, the query.

5. The method of claim 1, wherein the caching is based on a time to live value associated with the resource record.

6. The method of claim 1, wherein the resource record corresponds to a website, wherein the query comprises a request to resolve the website into an internet protocol address, and wherein the reply comprises the internet protocol address.

7. The method of claim 1, wherein the transmitting comprises transmitting, from the first DNS device to all other DNS devices in the plurality of DNS devices, the infoiniation of the reply.

8. The method of claim 1, wherein the transmitting comprises:
 creating, by the first DNS device, transaction signature key information for authentication of communication between DNS devices in the plurality of DNS devices; and
 transmitting, from the first DNS device to the second DNS device, the transaction signature key information.

9. A method comprising:
 receiving, by a first domain name services (DNS) device of a plurality of DNS devices, information comprising a plurality of replies to queries for access to resource records;
 caching, by the first DNS device, the information; and
 transmitting, at a predetermined interval, from the first DNS device, and to a second DNS device of the plurality of DNS devices, at least a portion of the information, wherein the first DNS device is associated with a first load balancer device and the second DNS device is associated with a second load balancer device.

10. The method of claim 9, further comprising receiving, by the first DNS device from a third DNS device, transaction signature key information for authentication of communication between DNS devices in the plurality of DNS devices.

11. The method of claim 9, wherein the caching is based on a time to live value associated with at least one of the resource records.

12. The method of claim 9, wherein the predetermined interval is configurable.

13. The method of claim 9, wherein the transmitting comprises transmitting, via an internet protocol version independent multicast DNS device caching protocol, the information.

14. A method comprising:
 receiving, by a first domain name services (DNS) device of a plurality of DNS devices and from a first load balancer device, a DNS query for access to a resource record;
 receiving, by the first DNS device, a reply to the DNS query;
 caching, by the first DNS device, the reply; and
 transmitting, to a second DNS device of the plurality of DNS devices, and prior to receiving, from the second DNS device, a request for the reply to the DNS query, an indicator that comprises the reply, wherein the first DNS device is associated with the first load balancer device and the second DNS device is associated with a second load balancer device.

15. The method of claim 14, wherein
the transmitting the indicator comprises transmitting, via a multicast transmission, the indicator.

16. The method of claim 14, further comprising:
- creating, by the first DNS device, transaction signature key information for authentication of communication between DNS devices in the plurality of DNS devices; and
- transmitting, from the first DNS device to the second DNS device, the transaction signature key information.

17. The method of claim 14, wherein the transmitting comprises transmitting from the first DNS device to all DNS devices of the plurality of DNS devices, the reply to the DNS query.

18. The method of claim 14, further comprising receiving the DNS query by the first load balancer device from a user device.

19. The method of claim 14, wherein the transmitting comprises multicasting.

20. The method of claim 14, further comprising transmitting, to an authoritative DNS device, the DNS query.

\* \* \* \* \*

UNITED STATES PATENT AND TRADEMARK OFFICE
CERTIFICATE OF CORRECTION

Page 1 of 1

PATENT NO.         : 10,715,377 B2
APPLICATION NO.    : 13/724405
DATED              : July 14, 2020
INVENTOR(S)        : Brzozowski et al.

It is certified that error appears in the above-identified patent and that said Letters Patent is hereby corrected as shown below:

In the Claims

Column 9, Claim 3, Line 67:
Please delete "serszver." and insert --server.--

Column 10, Claim 7, Line 14:
Please delete "infoiniation" and insert --information--

Signed and Sealed this
Twentieth Day of July, 2021

Drew Hirshfeld
*Performing the Functions and Duties of the
Under Secretary of Commerce for Intellectual Property and
Director of the United States Patent and Trademark Office*